United States Patent
Toyokawa (10) Patent No.: US 9,587,738 B2
(45) Date of Patent: Mar. 7, 2017

(54) AUTOMATIC SHIFT CONTROL SYSTEM

(71) Applicant: TOYOTA JIDOSHA KABUSHIKI KAISHA, Toyota-shi, Aichi-ken (JP)

(72) Inventor: Shuji Toyokawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/944,591

(22) Filed: Nov. 18, 2015

(65) Prior Publication Data

US 2016/0146340 A1 May 26, 2016

(30) Foreign Application Priority Data

Nov. 20, 2014 (JP) .................................. 2014-236036

(51) Int. Cl.
*F16H 61/12* (2010.01)

(52) U.S. Cl.
CPC ..... *F16H 61/12* (2013.01); *F16H 2061/1232* (2013.01); *F16H 2061/1284* (2013.01)

(58) Field of Classification Search
None
See application file for complete search history.

(56) References Cited

U.S. PATENT DOCUMENTS

| | | | |
|---|---|---|---|
| 2007/0066445 A1* | 3/2007 | Kobayashi | F16H 61/12 477/125 |
| 2008/0076632 A1* | 3/2008 | Watanabe | F16H 59/72 477/98 |
| 2009/0171545 A1* | 7/2009 | Shimizu | F16H 61/12 701/60 |

FOREIGN PATENT DOCUMENTS

| | | |
|---|---|---|
| JP | 2006-153211 A | 6/2006 |
| JP | 2007-177934 A | 7/2007 |

* cited by examiner

*Primary Examiner* — Edwin A Young
(74) *Attorney, Agent, or Firm* — Oliff PLC (57) ABSTRACT

In the event of a failure to detect an operation position Psh, a shift command to a forward gear position (in this embodiment, the second-speed gear position "2nd" and the eight-speed gear position "8th") established in association with an engagement device (in this embodiment, a brake B1) that causes locking of drive wheels when engaged with a one-way clutch F1, out of given forward gear positions formed when the operation position is a forward traveling operation position D, is not generated.

2 Claims, 8 Drawing Sheets

|  | C1 | C2 | C3 | C4 | B1 | B2 | F1 |
|---|---|---|---|---|---|---|---|
| P |  |  |  |  |  |  |  |
| Rev |  |  | ◯ |  |  | ◯ |  |
| N |  |  |  |  |  |  |  |
| 1st | ◯ |  |  |  |  | ◎ | ◯ |
| 2nd | ◯ |  |  |  | ◯ |  |  |
| 3rd | ◯ |  | ◯ |  |  |  |  |
| 4th | ◯ |  |  | ◯ |  |  |  |
| 5th | ◯ | ◯ |  |  |  |  |  |
| 6th |  | ◯ |  | ◯ |  |  |  |
| 7th |  | ◯ | ◯ |  |  |  |  |
| 8th |  | ◯ |  |  | ◯ |  |  |

◯ : ENGAGED  ◎ : ENGAGED WHEN DRIVEN

AUTOMATIC SHIFT CONTROL SYSTEM

INCORPORATION BY REFERENCE

The disclosure of Japanese Patent Application No. 2014-236036 filed on Nov. 20, 2014 including the specification, drawings and abstract is incorporated herein by reference in its entirety.

BACKGROUND OF THE INVENTION

1. Field of the Invention

The invention relates to an automatic shift control system in which gear positions are established when a selected one or more of friction engagement devices and a one-way clutch are engaged.

2. Description of Related Art

A control system of an automatic transmission which enables the vehicle to run, in the event of a failure to detect an operation position of a shifting member, is well known in the art. One example of this type of control system is a hydraulic control system of an automatic transmission described in Japanese Patent Application Publication No. 2007-177934 (JP 2007-177934 A). When a shift position cannot be detected, control for forming a forward first-speed position is performed, and the forward first-speed position is kept formed as it is if the actual shift position is a forward range, as described in JP 2007-177934 A. When a shift position cannot be detected, and the actual shift position is a reverse range, a forward range pressure needed to form the forward first-speed position is not generated from a manual shift valve that operates in association with the shift lever, and a hydraulic control circuit is configured to supply a reverse range pressure generated from the manual shift valve, to an engagement device for forming a reverse or backward traveling position, as also described in JP 2007-177934 A.

SUMMARY OF THE INVENTION

In the meantime, in the event of the failure as described above, it is desirable to generate a command to switch or change the gear position according to the vehicle speed, for example, in addition to generating a command to form the forward first-speed gear position, assuming that the operation position is a forward traveling operation position irrespective of the actual operation position, thereby to assure traveling performance in a middle- to high-vehicle-speed region, as well as traveling performance at the start of the vehicle or in a low-vehicle-speed region. Meanwhile, depending on the configuration of the automatic transmission, there is a friction engagement device that restricts rotation of drive wheels in a backward direction when it is engaged along with a one-way clutch. Since the forward traveling operation position is regarded as the operation position during backward traveling of the vehicle when the failure occurs and the backward traveling operation position is selected, there is a possibility of generating a command to shift the transmission to a forward gear position established in association with the friction engagement device that restricts backward rotation of the drive wheels when engaged along with the one-way clutch. In this case, the speed of rotation of the drive wheels is reduced if the vehicle is traveling backward. To solve this problem, it may be considered to add hardware configuration, such as a fail-safe valve, which operates in response to a reverse range pressure, for example, to the friction engagement device that causes reduction of rotation of the drive wheels during backward traveling when engaged along with the one-way clutch, and prevent the friction engagement device from being engaged when the backward traveling operation position is selected. However, the addition of the hardware configuration is not desirable since it causes increases in the cost and installation space, and the above-described problem still needs to be further considered. The problem as described above has not been known.

This invention provides an automatic shift control system that is able to curb reduction of rotation of drive wheels during backward traveling, without adding hardware configuration, when a shift command that would be generated when the operation position is a forward traveling operation position is generated at the time of a failure to detect the operation position.

An automatic shift control system includes: an automatic transmission including a plurality of friction engagement devices, a one-way clutch, and a hydraulic control device configured to supply hydraulic pressures to the plurality of friction engagement devices and the one-way clutch, the hydraulic control device being configured to supply a reverse pressure to a first friction engagement device, the reverse pressure being a hydraulic pressure generated when an actual operation position of a shifting member is a backward traveling operation position, the first friction engagement device being a friction engagement device associated with establishment of a predetermined reverse gear position, the automatic transmission being configured to establish a plurality of gear positions having different gear ratios when a selected one or more of the plurality of friction engagement devices and the one-way clutch are engaged; and an electronic control unit configured to i) determine whether there is a failure to detect the operation position of the shifting member, ii) output a shift command to establish a given gear position when the operation position of the shifting member is a traveling operation position, and iii) output a shift command to be generated when the operation position is a forward traveling operation position, when the failure to detect the operation position of the shifting member occurs, such that predetermined forward gear positions are established, the predetermined forward gear positions being gear positions excluding at least one gear position established in association with a second friction engagement device, the second friction engagement device being a friction engagement device that restricts backward rotation of drive wheels when engaged along with the one-way clutch.

With the above arrangement, in the event of a failure to detect the operation position of the shifting member, the shift command that would be generated when the operation position is a forward traveling operation position is generated, so that substantially the same traveling performance as that in the case where there is no failure can be ensured if the actual operation position is the forward traveling operation position. If the actual operation position is a backward traveling operation position at the time of the above-described failure, a given reverse gear position is established, and the backward traveling performance can be ensured. Also, in the event of the above-described failure, a shift command for shifting to any forward gear position established in association with the friction engagement device that restricts rotation of the drive wheels in the backward direction when engaged along with the one-way clutch, out of the predetermined forward gear positions, is not generated. Accordingly, when the shift command that would be generated when the operation position is the forward traveling operation position is generated at the time of the failure to detect the operation position, it is possible to curb reduction of the speed of rotation of the drive wheels during backward traveling, without adding any hardware configuration.

In the automatic shift control system according to the above aspect of the invention, the shift command to be generated when the operation position is the forward traveling operation position may be a shift command for switching the predetermined forward gear positions according to a vehicle speed. The electronic control unit may be configured to output the shift command to be generated when the operation position is the forward traveling operation position, when the failure to detect the operation position of the shifting member occurs, such that the automatic transmission is shifted up or down while skipping the at least one forward gear position established in association with the second friction engagement device. With this arrangement, it is possible to prevent reduction of (the speed of) rotation of the drive wheels during backward traveling. In addition (Furthermore), when the actual operation position is the forward traveling operation position, the running performance in a middle- to high-(vehicle-)speed region, as well as the running performance at the start of the vehicle or in a low-(vehicle-)speed region, can be appropriately ensured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described in detail with reference to the drawings.

Figure 1:
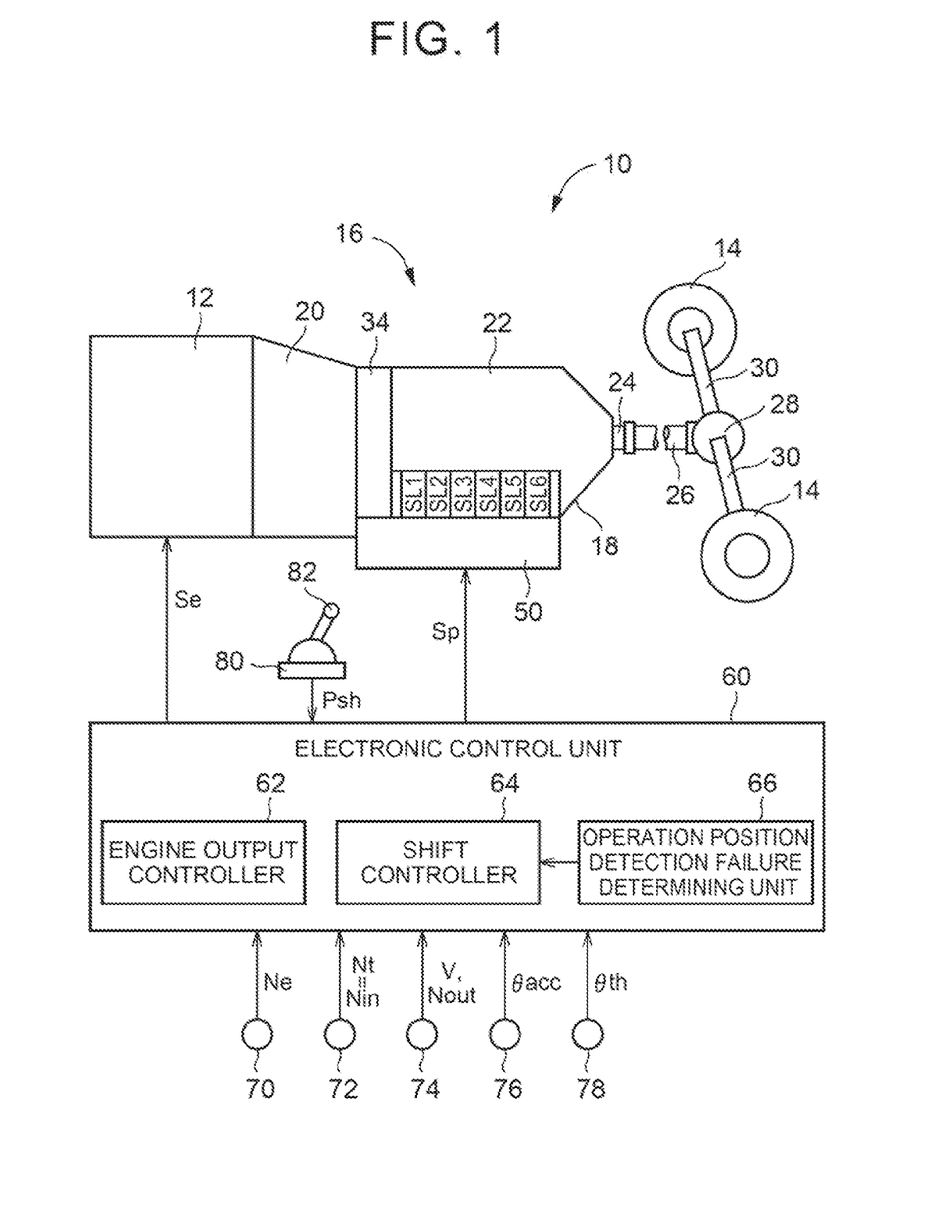
FIG. 1 is a view illustrating the general configuration of a vehicle to which the invention is applied, and also illustrating a principal part of a control system in the vehicle.

FIG. 1 illustrates the general configuration of a vehicle 10 to which this invention is applied, and also illustrates a principal part of a control system in the vehicle 10. In FIG. 1, the vehicle 10 includes an engine 12, such as a gasoline engine or a diesel engine, which functions as a driving power source for running the vehicle, drive wheels 14, and a power transmission system 16 provided between the engine 12 and the drive wheels 14. The power transmission system 16 includes a known torque converter 20 as a hydraulic transmission device coupled to the engine 12, an automatic transmission 22 coupled to the torque converter 20, a propeller shaft 26 coupled to an output shaft 24 as an output rotary member of the automatic transmission 22, a differential gear device (differential gear) 28 coupled to the propeller shaft 26, a pair of axles 30 coupled to the differential gear device 28, and so forth, within a transmission case 18 (which will be called "case 18") as a non-rotating member attached to the vehicle body. In the power transmission system 16 constructed as described above, power (that is synonymous with torque and force when they are not particularly distinguished from each other) of the engine 12 is transmitted to a pair of drive wheels 14, via the torque converter 20, automatic transmission 22, propeller shaft 26, differential gear device 28, and the axles 30, for example, in the order of description.

Figure 2:
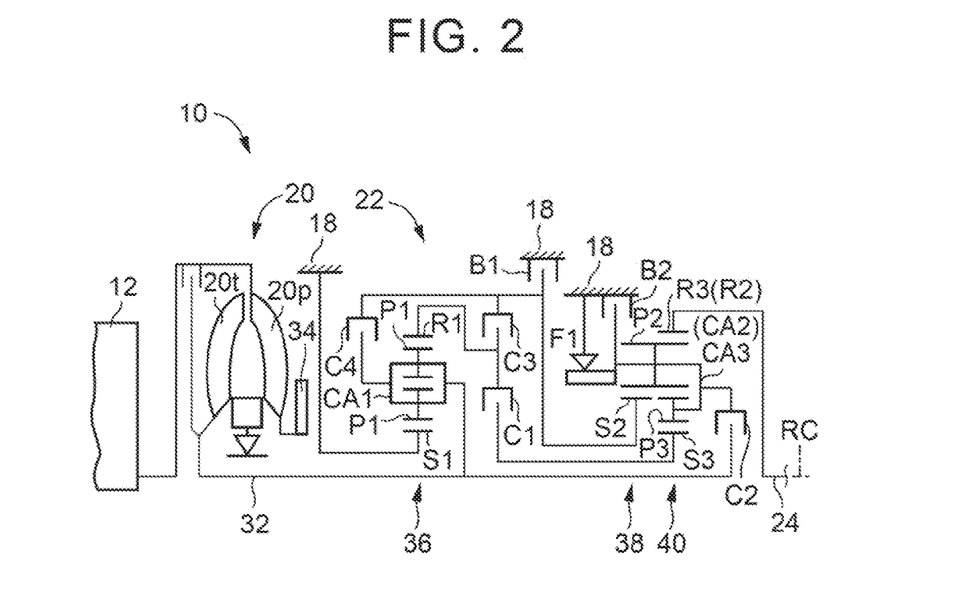
FIG. 2 is a skeleton diagram illustrating a torque converter and an automatic transmission.

FIG. 2 is a skeleton diagram illustrating the torque converter 20 and the automatic transmission 22. The torque converter 20, automatic transmission 22, and other components are substantially symmetrically constructed with respect to a center line (axis RC), and the lower half of each component below the center line is omitted in FIG. 2. The axis RC in FIG. 2 is the rotational axis of the engine 12 and the torque converter 20.

In FIG. 2, the torque converter 20 is mounted so as to rotate about the axis RC, and includes a pump impeller 20$p$ coupled to the engine 12, and a turbine wheel 20$t$ coupled to a transmission input shaft 32 as an input rotary member of the automatic transmission 22. A mechanical oil pump 34 is coupled to the pump impeller 20$p$. In operation, the oil pump 34 is rotated/driven by the engine 12 so as to generate hydraulic pressure for performing shift control of the automatic transmission 22, and supplying lubricating oil to each part of a power transmission path of the power transmission system 16.

The automatic transmission 22 is a planetary gear type multi-speed transmission that functions as a stepwise variable automatic transmission in which one or more of a plurality of friction engagement devices and a one-way clutch F1 is/are selectively engaged so that a plurality of gear positions (speeds) having different gear ratios (speed ratios) are established. For example, the automatic transmission 22 is a stepwise variable transmission that performs so-called clutch-to-clutch shifting and is often used in known vehicles. The automatic transmission 22 has a double-pinion type first planetary gear unit 36, a single-pinion type second planetary gear unit 38 of a Ravigneaux type, and a double-pinion type third planetary gear unit 40, which are disposed on the same axis (on the axis RC). The automatic transmission 22 changes the speed of rotation of the transmission input shaft 32, and delivers the resulting rotary power from the output shaft 24.

As well known in the art, each of the first planetary gear unit 36, second planetary gear unit 38, and the third planetary gear unit 40 consists of three rotational elements (rotary members), i.e., a sun gear (S1, S2, S3), a carrier (CA1, CA2, CA3) that supports pinion gears (P1, P2, P3) such that the pinion gears can rotate about themselves and about the sun gear, and a ring gear (R1, R2, R3) that meshes with the sun gear via the pinion gears. Parts of these three rotational elements are connected to each other or connected to the transmission input shaft 32, case 18, or the output shaft 24, directly or indirectly (or selectively) via the friction engagement devices (clutches C1, C2, C3, C4 and brakes B1, B2) and the one-way clutch F1.

The above-mentioned clutches C1, C2, C3, C4 and brakes B1, B2 (which will be simply called "clutches C", "brakes B", or "engagement devices" when they are not particularly distinguished) are hydraulic friction engagement devices often used in known vehicle automatic transmissions. Each of these clutches and brakes may be in the form of a multiplate wet clutch or brake pressed by a hydraulic actuator, or a band brake pulled and tightened by a hydraulic actuator. In the meantime, the automatic transmission 22 includes a hydraulic control circuit 50 (see FIG. 1, FIG. 6) having linear solenoid valves SL1-SL6, etc. corresponding to the clutches C and brakes B, respectively. The torque capacity (i.e., engaging force) of each of the clutches C and brakes B is changed by a hydraulic pressure applied from a corresponding one of the linear solenoid valves SL1-SL6, so that the clutches C and brakes B are selectively placed in an engaged state and a released state.

Figure 3:
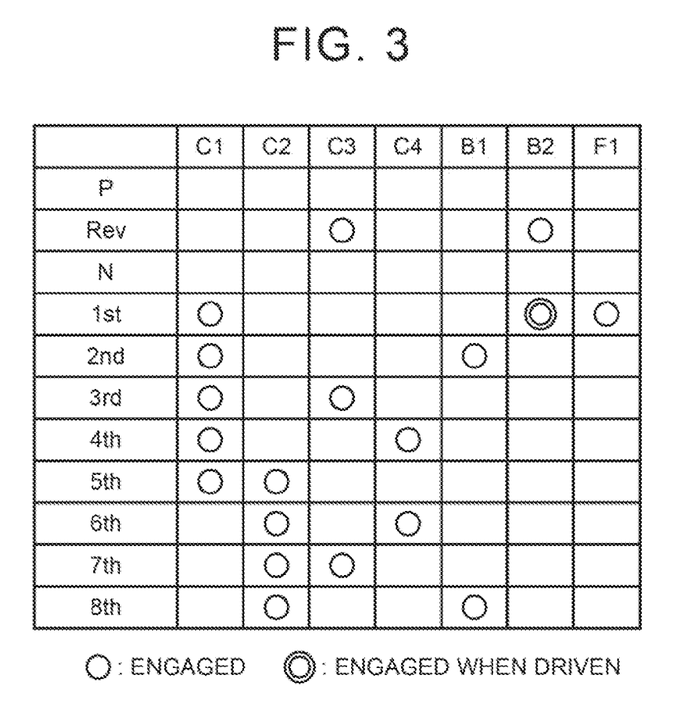
FIG. 3 is an operation table indicating combinations of friction engagement devices and a one-way clutch which are engaged or released when gear positions of the automatic transmission are established.
Figure 4:
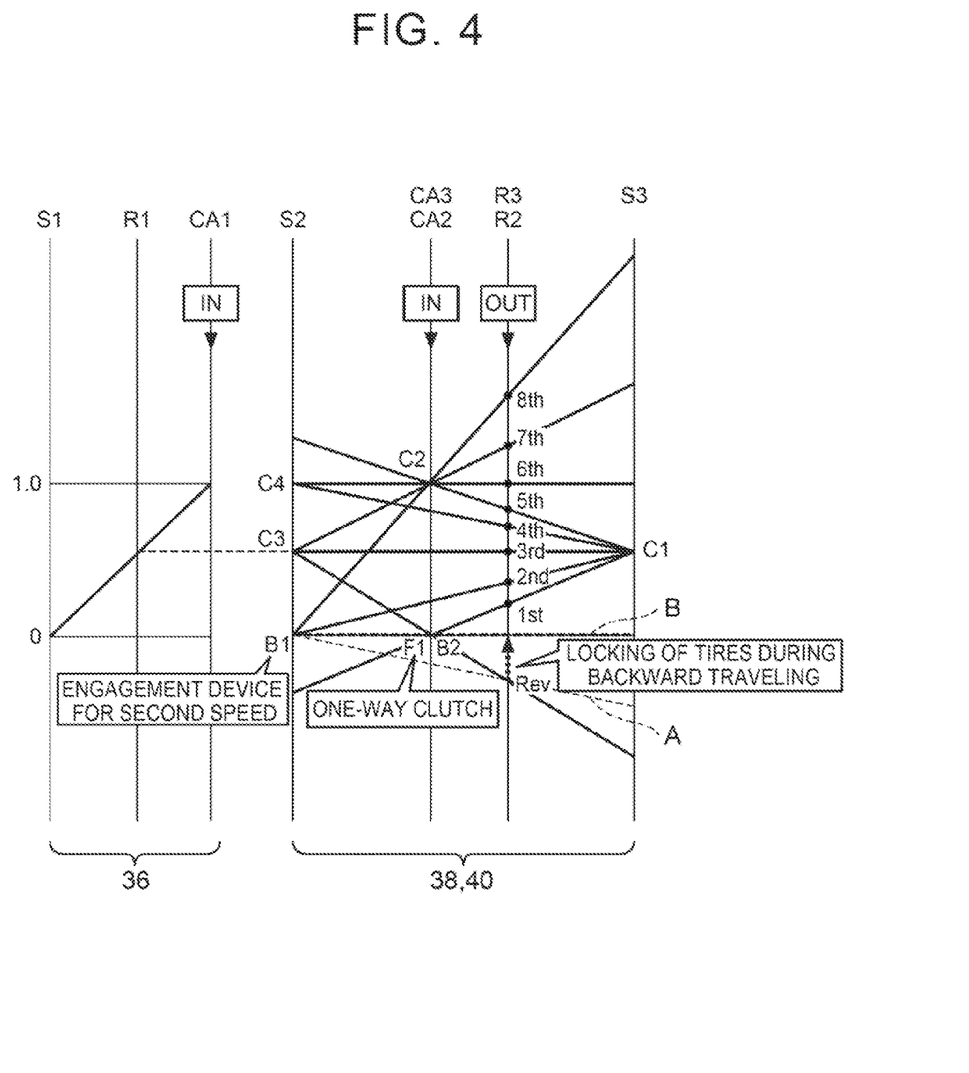
FIG. 4 is a nomographic chart useful for explaining operation of the automatic transmission.

With the clutches C and the brakes B thus controlled to be engaged or released by the hydraulic control circuit 50, each gear position of forward 8-speed, reverse 1-speed gear positions is established according to the accelerating operation of the driver, the vehicle speed V, and so forth, as indicated in the engagement operation table of FIG. 3 and the nomographic chart of FIG. 4. In FIG. 3, "1st" through "8th" mean a first-speed gear position through an eighth-speed gear position, respectively, as forward gear positions, "Rev" means a reverse gear position, "N" means a neutral condition in which none of the gear positions is established, and "P" means the neutral condition and a condition where rotation of the output shaft 24 is mechanically inhibited or locked. The gear ratio γ (=transmission input shaft speed Nin/output shaft speed Nout) of the automatic transmission 22 corresponding to each gear position is suitably determined by respective gear ratios (=the number of teeth of the sun gear/the number of teeth of the ring gear) ρ1, ρ2, ρ3 of the first planetary gear unit 36, second planetary gear unit 38, and the third planetary gear unit 40.

The engagement operation table of FIG. 3 indicates the relationship between each of the above-indicated gear positions and respective operating states of the clutches C and brakes B. In FIG. 3, "○" indicates that the clutch or brake in question is engaged, "⊙" indicates that the clutch or brake in question is engaged only when it is driven, for example, and blank indicates that the clutch or brake in question is released. Thus, in the automatic transmission 22, a selected one of the gear positions is established when a given engagement device or devices is/are engaged by hydraulic pressure from the corresponding one(s) of the linear solenoid valves SL1-SL6. It is, however, to be noted that, in the automatic transmission 22 of this embodiment, the one-way clutch F1 and the brake B2 are provided in parallel to each other, between the carrier CA2 and carrier CA3 that are integrally coupled to each other, and the case 18. The one-way clutch F1 inhibits reverse rotation of the carrier CA2 and the carrier CA3 while permitting positive rotation (in the same rotational direction as that of the transmission input shaft 32) of the carrier CA2 and the carrier CA3. Accordingly, when the engine 12 rotates and drives the drive wheels 14, the first-speed gear position "1st" is established through automatic engagement of the one-way clutch F1, without requiring the brake B2 to be engaged.

Referring back to FIG. 1, the vehicle 10 is provided with an electronic control unit 60 including a control device of the automatic transmission 22 associated with shift control of the automatic transmission 22, for example. Thus, FIG. 1 is a view showing an input/output system of the electronic control unit 60, and is also a functional block diagram useful for explaining a principal part of control functions performed by the electronic control unit 60. The electronic control unit 60 includes a so-called microcomputer including CPU, RAM, ROM, input/output interface, etc., for example, and the CPU executes various controls of the vehicle 10, by performing signal processing according to programs stored in the ROM in advance while utilizing the temporary storage function of the RAM. For example, the electronic control unit 60 performs output control of the engine 12, shift control of the automatic transmission 22, and so forth, and is divided as needed into a subunit for engine output control, subunit for hydraulic control, and so forth.

The electronic control unit 60 is supplied with various actual values (e.g., the engine speed Ne, transmission input shaft speed Nin as the turbine speed Nt, output shaft speed Nout corresponding to the vehicle speed V, accelerator operation amount θacc, throttle opening θth, and the operation position (which will also be called "shift position" or "lever position") Psh of the shift lever 82 as the shifting member) based on detection signals obtained by various sensors (e.g., various rotational speed sensors 70, 72, 74, accelerator pedal position sensor 76, throttle sensor 78, and a shift position sensor 80) included in the vehicle 10. Also, an engine output control command signal Se for output control of the engine 12, a hydraulic control command signal Sp for hydraulic control regarding shifting of the automatic transmission 22, and so forth, are generated from the electronic control unit 60. For example, as the hydraulic control command signal Sp, a command signal (command pressure) for driving each of the linear solenoid valves SL1-SL6 that regulate respective hydraulic pressures supplied to the corresponding hydraulic actuators ACT1-ACT6 of the clutches C and the brakes B is generated to the hydraulic control circuit 50.

Figure 5:
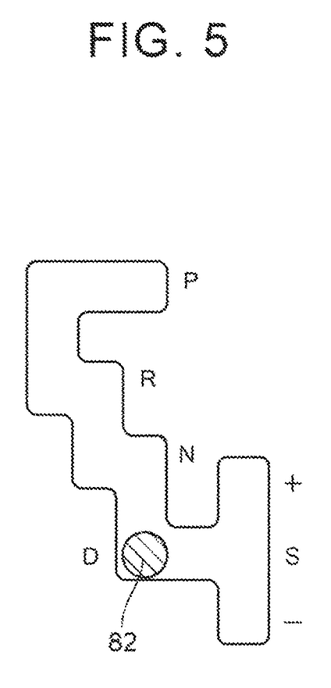
FIG. 5 is a view showing one example of operation positions of a shift lever.

FIG. 5 shows one example of operation positions Psh of the shift lever 82. As shown in FIG. 5, the shift lever 82 is manually operated to one of the operation positions "P", "R", "N", "D", and "S". The operation position "P" is a parking operation position P for selecting a parking position (P position) of the automatic transmission 22, and placing the automatic transmission 22 in a neutral condition in which the power transmission path is cut off while mechanically inhibiting rotation of the output shaft 24. The operation position "R" is a backward traveling operation position R for selecting a backward traveling position (R position) of the automatic transmission 22 for running the vehicle backward. The backward traveling operation position R is a traveling operation position that permits backward traveling by using the reverse gear position of the automatic transmission 22. The operation position "N" is a neutral operation position N for selecting a neutral position (N position) of the automatic transmission 22 and placing the automatic transmission 22 in the neutral condition. The operation position "D" is a forward traveling operation position D for selecting a forward traveling position (D position) of the automatic transmission 22 for running the vehicle forward. The forward traveling operation position D is a traveling operation position in which automatic shift control using all of the forward gear positions, i.e., the first-speed gear position "1st" through the eighth-speed gear position "8th", is performed in the shift range (D range) that permits shifting of the automatic transmission 22, so as to enable the vehicle to travel forward. The operation position "S" is a sequential operation position S for limiting the shift range of the gear position in the D position of the automatic transmission 22. The sequential operation position S is a traveling operation position that permits manual shifting by switching a plurality of types of shift ranges having different high-vehicle-speed-side (high-side) gear positions to which the transmission can be shifted. In the operation position "S", an upshift operation position "+" for shifting the shift range upward each time the shift lever 82 is operated, and a downshift operation position "−" for shifting the shift range downward each time the shift lever 82 is operated are provided.

Figure 6:
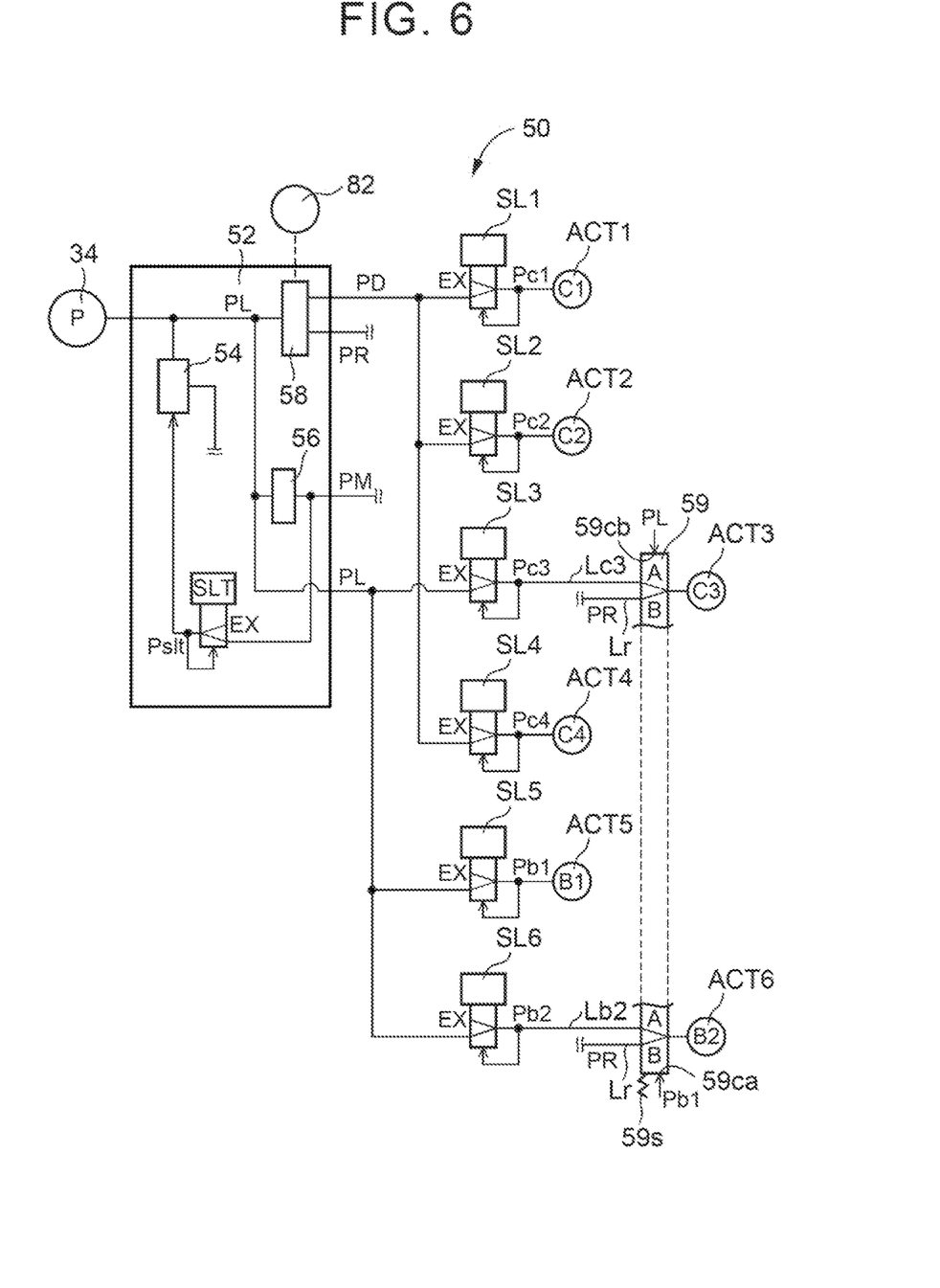
FIG. 6 is a circuit diagram showing one example of a principal part of a hydraulic control circuit in connection with linear solenoid valves, etc. that control operation of each hydraulic actuator of clutches and brakes.

FIG. 6 is a circuit diagram showing a principle part of the hydraulic control circuit 50 associated with the linear solenoid valves SL1-SL6, etc. that control operation of the respective hydraulic actuators ACT1-ACT6 of the clutches C and brakes B. In FIG. 6, the hydraulic control circuit 50 includes a hydraulic supply device 52, and the linear solenoid valves SL1-SL6.

The hydraulic supply device 52 includes a primary regulator valve 54 of a relief-type, for example, which regulates a line pressure PL using a hydraulic pressure generated by the oil pump 34 as the original pressure, and a linear solenoid valve SLT that supplies a signal pressure $P_{slt}$ to the primary regulator valve 54 so that the line pressure PL is regulated according to the engine load (e.g., engine torque Te or transmission input torque Tat) represented by the throttle opening θth, etc. The hydraulic supply device 52 further includes a modulator valve 56 that regulates a modulator pressure PM to a certain value using the line pressure PL as the original pressure, and a manual valve 58 in which oil channels are mechanically switched in association with the switching or selecting operation of the shift lever 82. When the shift lever 82 is in the forward traveling operation position D or sequential operation position S, the manual valve 58 generates the received line pressure PL as a forward-drive pressure (D range pressure, drive pressure) PD. When the shift lever 82 is in the backward traveling operation position R, the manual valve 58 generates the received line pressure PL as a reverse-drive pressure (R range pressure, reverse pressure) PR. Also, when the shift lever 82 is in the neutral operation position N or the parking operation position P, the manual valve 58 shuts off output of hydraulic pressure, and leads the drive pressure PD and the reverse pressure PR to the discharge side. Thus, the hydraulic supply device 52 generates the line pressure PL, modulator pressure PM, drive pressure PD, and reverse pressure PR.

Hydraulic pressures Pc1, Pc2, Pc4 regulated by the linear solenoid valves SL1, SL2, SL4, respectively, using the drive pressure PD as the original pressure, are supplied to the respective hydraulic actuators ACT1, ACT2, ACT4 of the clutches C1, C2, C4. Also, hydraulic pressures Pc3, Pb1, Pb2 regulated by the linear solenoid valves SL3, SL5, SL6, respectively, using the line pressure PL as the original pressure, are supplied to the respective hydraulic actuators ACT3, ACT5, ACT6 of the clutch C3 and the brakes B1, B2. The linear solenoid valves SL1-SL6 basically have the same configuration, and excitation, non-excitation and current control of these solenoid valves are independently performed by the electronic control unit 60. The hydraulic control circuit 50 further includes a switching valve 59, and the hydraulic pressures Pc3, Pb2 are supplied to the hydraulic actuators ACT3, ACT6, via the switching valve 59, as will be described later.

Referring back to FIG. 1, the electronic control unit 60 includes an engine output controller 62, and a shift controller 64.

The engine output controller 62 calculates required driving force Fdem by applying the actual accelerator operation amount θacc and the vehicle speed V to a predetermined relationship (e.g., a driving force map) empirically or computationally obtained in advance and stored, for example, and sets a target engine torque Tetgt that provides the required driving force Fdem. Then, the engine output controller 62 outputs engine output control command signals Se for controlling the output of the engine 12, to a throttle actuator, fuel injection devices and ignition devices, for example, so as to provide the target engine torque Tegt.

Figure 7:
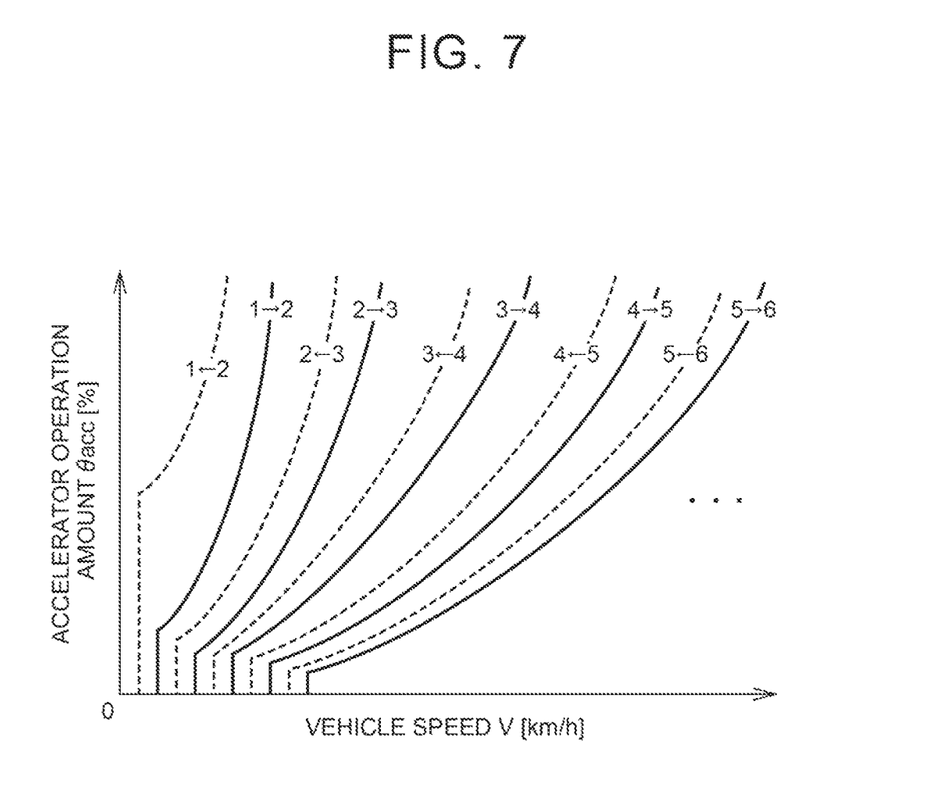
FIG. 7 is a view showing one example of a shift diagram used in shift control of an electronic control unit.

The shift controller 64 performs control for switching engagement and release of the engagement devices according to the operation position Psh of the shift lever 82. More specifically, when the operation position Psh is the neutral operation position N or the parking operation position P, the shift controller 64 releases all of the engagement devices. When the operation position Psh is any traveling operation position as one of the forward traveling operation position D, sequential operation position S, and the backward traveling operation position R, the shift controller 64 outputs a shift command to engage appropriate ones of the engagement devices so as to establish a given gear position according to the engagement table shown in FIG. 3, for example. When the operation position Psh is the forward traveling operation position D, for example, the shift controller 64 makes a shift determination (i.e., determine a forward gear position) by applying the actual vehicle speed V and accelerator operation amount Acc to a predetermined relationship (shift map, shift diagram) using the vehicle speed V and the accelerator operation amount Acc as variables as shown in FIG. 7, for example. Then, the shift controller 64 outputs a hydraulic control command signal Sp as a shift command for engaging and/or releasing the engagement devices associated with shifting of the automatic transmission 22, to the hydraulic control circuit 50, so as to establish the forward gear position thus determined. According to the hydraulic control command signal Sp, the linear solenoid valves SL1-SL6 in the hydraulic control circuit 50 are driven so that shifting of the automatic transmission 22 is carried out, and the hydraulic actuators ACT-ACT6 of the engagement devices associated with the shifting are operated. In the shift map of FIG. 7, solid lines are upshift lines based on which upshift is determined, and broken lines are downshift lines based on which downshift is determined. In the shift map of FIG. 7, shift lines for the first-speed gear position "1st" through the sixth-speed gear position "6th", out of the first-speed gear position "1st" through the eighth-speed gear position "8th" to which the automatic transmission 22 can be shifted, are illustrated by way of example.

In the meantime, there is a possibility of occurrence of a failure, namely, a possibility that the operation position Psh of the shift lever 82 fails to be detected, due to a malfunction of a contact point of the shift position sensor 80, or disconnection or short-circuiting of a signal line through which a signal is transmitted from the shift position sensor 80. In the event of the failure to detect the operation position Psh, the shift controller 64 outputs a shift command that would be generated when the operation position Psh is the forward traveling operation position D. Namely, in the event of the above-described failure, the forward traveling operation position D is regarded as the operation position Psh irrespective of the actual operation position. More specifically, in the event of the above-described failure, the shift controller 64 makes a shift determination by applying the actual vehicle speed V and accelerator operation amount Acc to the shift map as shown in FIG. 7, for example, and outputs a shift command based on the shift determination. Thus, if the actual operation position is the forward traveling operation position D (or the sequential operation position S), at the time of the failure, the hydraulic pressures Pc1, Pc2, Pc3, Pc4, Pb1, Pb2 regulated using the line pressure PL and the drive pressure PD delivered from the hydraulic supply device 52 as the original pressures are respectively supplied to the corresponding hydraulic actuators ACT1-ACT6 of the engagement devices associates with establishment of the gear position, so that the gear position is changed according to the shift determination. Also, if the actual operation position is the neutral operation position N, parking operation position P, or the backward traveling operation position R, at the time of the failure, the drive pressure PD is not delivered from the hydraulic supply device 52, and the hydraulic pressures Pc1, Pc2, Pc4 are not supplied to the hydraulic actuators ACT1, ACT2, ACT4; therefore, none of the forward gear positions is established even if the shift command that would be generated when the shift lever 82 is in the forward traveling operation position D is generated.

If the actual operation position is the backward traveling operation position R, at the time of the above-described failure, the reverse pressure PR is delivered from the hydraulic supply device 52. Then, the reverse gear position is established, using the reverse pressure PR. More specifically, the switching valve 59 provided in the hydraulic control circuit 50 has a spool valve element whose valve position is switched between a valve position A and a valve position B. In the valve position A, an oil passage Lc3 through which the hydraulic pressure Pc3 flows is connected to the hydraulic actuator ACT3, and an oil passage Lb2 through which the hydraulic pressure Pb2 flows is connected to the hydraulic actuator ACT6. In the valve position B, an oil passage Lr through which the reverse pressure PR flows is connected to the hydraulic actuator ACT3, and the oil passage Lr is connected to the hydraulic actuator ACT6. The switching valve 59 includes a spring 59$s$ that biases the spool valve element toward the valve position A, an oil chamber 59$ca$ that receives the hydraulic pressure Pb1 for biasing the spool valve element toward the valve position A, and an oil chamber 59$cb$ that receives the line pressure PL for biasing the spool valve element toward the valve position B. In the switching valve 59 thus constructed, when the line pressure PL is regulated according to the engine load, the spool valve element is held in the valve position A under the bias force of the spring 59$s$. On one hand, when the line pressure PL is regulated to be equal to the maximum line pressure PLmax, the spool valve element is held in the valve position B. On the other hand, when the hydraulic pressure Pb1 is generated, the spool valve element is held in the valve position A even if the line pressure PL is the maximum line pressure PLmax. Accordingly, if the hydraulic pressure Pb1 is not generated, and the line pressure PL is equal to the maximum line pressure PLmax, while the actual operation position is the backward traveling operation position R, at the time of the above-described failure, the reverse pressure PR is supplied to the hydraulic actuators ACT3, ACT6, via the switching valve 59 held in the valve position B, so that the reverse gear position is established, If the above-described failure does not occur, the line pressure PL is regulated according to the engine load, and the hydraulic pressures Pc3, Pb2 are supplied to the hydraulic actuators ACT3, ACT6, via the switching valve 59 held in the valve position A. Thus, in the event of the failure to detect the operation position Psh, the hydraulic control circuit 50 supplies the reverse pressure PR that would be generated when the actual operation position is the backward traveling operation position R, to the clutch C3 and the brake B2 as the friction engagement devices associated with establishment of the reverse gear position.

As described above, when the shift lever 82 is operated to the backward traveling operation position R at the time of the failure, the vehicle is able to travel backward even if the shift command that would be generated when the shift lever 82 is in the forward traveling operation position D is generated. In this connection, during backward traveling at the time of the failure, as the vehicle speed V increases, a shift command for engaging the clutch C1 and the brake B1 is generated so as to form the second-speed gear position "2nd". While the hydraulic pressure Pc1 for the clutch C1 is not generated since it uses the drive pressure PD as the original pressure, the hydraulic pressure Pb1 for the brake B1 is generated since it uses the line pressure PL as the original pressure. Since the hydraulic pressure Pb1 is also supplied to the oil chamber 59$ca$ of the switching valve 59, the switching valve 59 is held in the valve position A when the shift command for shifting to the second-speed gear position "2nd" is generated. Accordingly, the clutch C3 and the brake B2 are released, and therefore, interlocking (double engagement) of the automatic transmission 22 is avoided even if the brake B1 is engaged. On the other hand, even if the clutch C3 and the brake B2 are released, the automatic transmission 22 attempts to form a condition of broken line A indicated in the nomographic chart of FIG. 4, for example, if the brake B1 is engaged during backward traveling. However, since the one-way clutch F1 is provided in the automatic transmission 22, the condition of broken line A cannot be established, and the speed of rotation of the drive wheels 14 is reduced due to engagement of the brake B1 and the function of the one-way clutch F1. As a result, locking of the drive wheels as a phenomenon of stopping rotation of the drive wheels 14 takes place (see broken line B in the nomographic chart of FIG. 4).

In view of the above situation, at the time of the failure to detect the operation position Psh, the shift controller 64 outputs a shift command that would be generated when the operation position Psh is the forward traveling operation position D, so as to establish one of the forward gear positions established when the operation position Psh is the forward traveling operation position D, except for a forward gear position(s) established in association with an engagement device that restricts backward rotation of the drive wheels 14 when engaged along with the one-way clutch F1. For example, in the event of the failure to detect the operation position Psh, the shift controller 64 outputs the shift command that would be generated when the operation position Psh is the forward traveling operation position D, so that the automatic transmission 22 is shifted up or down while skipping the forward gear positions established in association with the engagement device that restricts backward rotation of the drive wheels 14 when engaged along with the one-way clutch F1. In the automatic transmission 22, the forward gear positions established is association with the engagement device that restricts backward rotation of the drive wheels 14 when engaged along with the one-way clutch F1 are the second-speed gear position "2nd" and the eighth gear position "8th". Accordingly, the shift command is generated at the time of the failure so as to shift the automatic transmission 22 from "1st" to "3rd", "3rd" to "4th", "4th" to "5th", "5th" to "6th", and "6th" to "7th", and from "7th" to "6th", "6th" to "5th", "5th" to "4th", "4th" to "3rd", and "3rd" to "1st". Since the vehicle speed V is not supposed to be increased to a level at which the automatic transmission 22 is shifted to the eighth-speed gear position "8th" in the reverse gear position, the shift command is generated so as to shift up or down the automatic transmission 22 between "1st" and "3rd", "3rd" and "4th", "4th" and "5th", "5th" and "6th", "6th" and "7th", and "7th" and "8th".

More specifically, the electronic control unit 60 further includes an operation position detection failure determining unit 66. The operation position detection failure determining unit 66 determines whether a failure to detect the operation position Psh occurs, based on whether the electronic control unit 60 does not receive a detection signal of the operation position Psh, for example.

Figure 8:
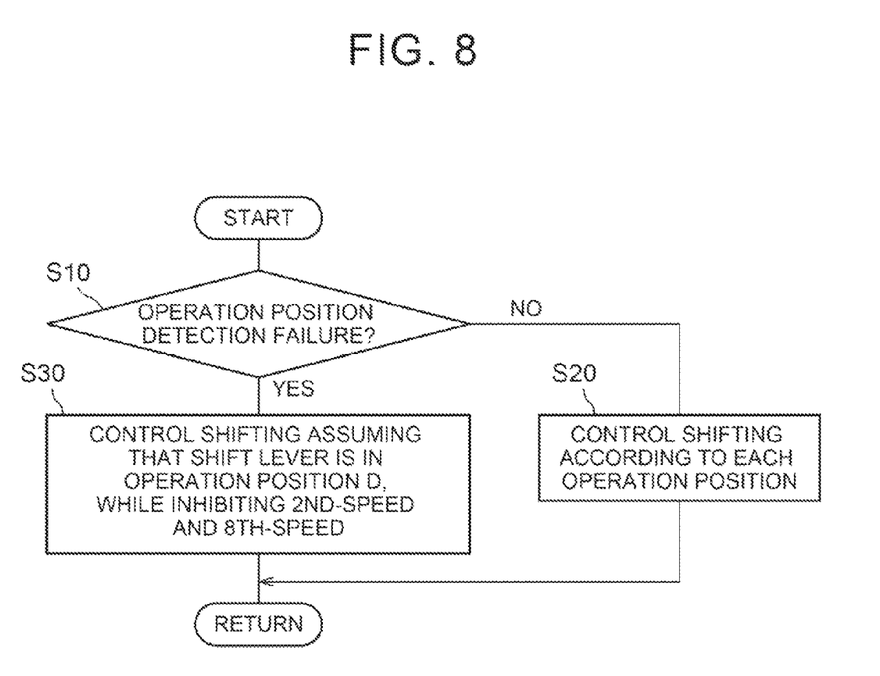
FIG. 8 is a flowchart illustrating a principal part of control operation of the electronic control unit, namely, control operation for curbing reduction of the speed of rotation of drive wheels during backward traveling, when a shift command that would be generated when the operation position is a forward traveling operation position is generated at the time of a failure to detect the operation position.

FIG. 8 is a flowchart illustrating a principal part of control operation of the electronic control unit 60, namely, control operation for preventing the speed of rotation of the drive wheels 14 from being reduced during backward traveling, when a shift command that would be generated when the operation position Psh is the forward traveling operation position D is generated, at the time of the failure to detect the operation position Psh. A control routine of the flowchart of FIG. 8 is repeatedly executed, for example.

In FIG. 8, initially, in step S10 corresponding to the operation position detection failure determining unit 66, it is determined whether a failure to detect the operation position Psh occurs. If a negative decision (NO) is obtained in step S10, control according to each operation position Psh is performed in step S20 corresponding to the shift controller 64. If, on the other hand, an affirmative decision (YES) is obtained in step S10, a hydraulic command that sets the line pressure PL to the maximum line pressure PLmax is generated to the linear solenoid valve SLT, in step S30 corresponding to the shift controller 64. Also, a shift command that would be generated when the operation position Psh is the forward traveling operation position D is generated, so that control is performed while regarding the forward traveling operation position D as the operation position Psh. At this time, the second-speed gear position "2nd" is inhibited, and the shift command is generated so that the automatic transmission 22 is shifted up or down while skipping the second-speed gear position "2nd".

As described above, according to this embodiment, at the time of the failure to detect the operation position Psh, the shift command that would be generated when the operation position Psh is the forward traveling operation position D is generated, so that the traveling performance equivalent to that in the absence of the above failure can be ensured when the actual operation position is the forward traveling operation position D. Also, when the actual operation position is the backward traveling operation position R at the time of the failure, the reverse gear position is established, and the backward traveling performance can be ensured. Also, at the time of the failure, the shift controller 64 does not output shift commands for shifting to the forward gear positions (in this embodiment, the second-speed gear position "2nd" and the eighth-speed gear position "8th") established in association with the engagement device (in this embodiment, the brake B1) that would cause locking of the drive wheels when it is engaged along with the one-way clutch F1, out of the given forward gear positions formed when the shift lever 82 is in the forward traveling operation position. Thus, when the shift command that would be generated when the operation position Psh is the forward traveling operation position D is generated at the time of the failure to detect the operation position Psh, the driving wheels are prevented from being locked during backward traveling.

Figure 9:
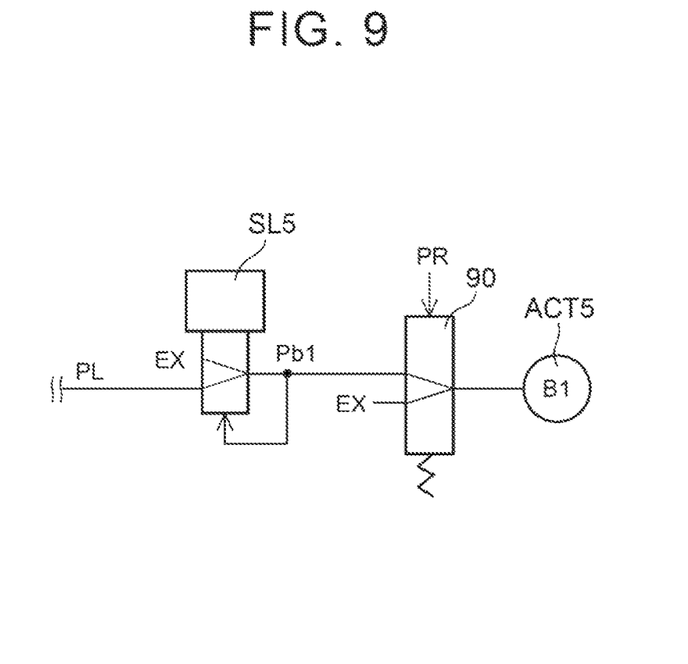
FIG. 9 is a view showing one example of hardware configuration that makes it possible to curb locking of drive wheels during backward traveling, as a comparative example for comparison with the embodiment to which no hardware configuration is added.

As shown in FIG. 9, for example, it is possible to prevent locking of the drive wheels during backward traveling, by adding a switching valve 90 that shuts off an oil passage through which the hydraulic pressure Pb1 is supplied to the hydraulic actuator ACT 5 when it receives the reverse pressure PR. On the other hand, in this embodiment as illustrated in the flowchart of FIG. 8, it is possible to prevent locking of the driving wheels during backward traveling, without adding the hardware configuration as shown in FIG. 9. Accordingly, it is possible to reduce the cost, reduce the weight or save space.

According to this embodiment, in the event of a failure to detect the operation position Psh, the shift controller 64 outputs a shift command that would be generated when the operation position Psh is the forward traveling operation position D, so that the automatic transmission 22 is shifted up or down while skipping the second-speed gear position "2nd" and the eighth-speed gear position "8th". Therefore, the drive wheels are prevented from being locked during backward traveling. In addition, when the actual operation position is the forward traveling operation position D, the traveling performance in a middle- to high-vehicle-speed region, as well as the traveling performance at the start of the vehicle or in a low-vehicle-speed region, can be appropriately ensured.

While one embodiment of the invention has been described in detail with reference to the drawings, the invention may be embodied in other forms.

For example, in the above-described embodiment, in the event of a failure to detect the operation position Psh, a shift command that would be generated when the operation position Psh is the forward traveling operation position D is generated, so that the automatic transmission 22 is shifted up or down while skipping the second-speed gear position "2nd" and the eighth-speed gear position "8th". However, this invention is not limited to this arrangement. For example, a shift command may be generated so as to effect shifting using the gear positions higher than the third-speed gear position "3rd", or a shift command may be generated so as to effect shifting using fixed gear positions, e.g., the first-speed gear position "1st", the third-speed gear position "3rd", and the fifth-speed gear position "5th". In sum, the shift command may be generated so as to effect shifting to gear positions other than at least the second-speed gear position "2nd" and the eighth-speed gear position "8th". Since the vehicle speed V is not supposed to be increased to a level at which the automatic transmission 22 is shifted to the eighth-speed gear position "8th" in the reverse gear position, the shift command at the time of the failure may be generated so as to shift up or down the automatic transmission 22 between "1st" and "3rd", "3rd" and "4th", "4th" and "5th", "5th" and "6th", "6th" and "7th", and "7th" and "8th". In this case, the statement in the block of step S30 of FIG. 8 will be "CONTROL SHIFTING ASSUMING THAT SHIFT LEVER IS IN OPERATION POSITION D, WHILE INHIBITING 2ND-SPEED". In step S30, when shifting is controlled assuming that the operation position Psh is the forward traveling operation position D, the second-speed gear position "2nd" is inhibited from being established, and a shift command is generated so as to effect shifting while skipping the second gear position "2nd". Also, when it is determined that the vehicle 10 is traveling backward, on the assumption that a shift command that would be generated when the shift lever is in the forward traveling operation position D is generated at the time of the failure, the shift command that would be generated in the forward traveling operation position D may be switched or changed to a shift command that would be generated when the shift lever is in the backward traveling operation position R. For example, if the actual gear ratio γ of the automatic transmission 22 calculated based on the transmission input shaft speed Nin and the output shaft speed Nout is the gear ratio of the reverse gear position, it is determined that the vehicle is traveling backward (or it is determined that the vehicle is traveling backward based on the direction of rotation detected by a sensor), and the shift command is switched to a shift command that would be generated when the shift lever is in the backward traveling operation position R.

While the valve position of the switching valve 59 is switched by the hydraulic pressure Pb1 in the above-described embodiment, this invention is not limited to this arrangement. For example, the valve position of the switching valve 59 may not be switched by the hydraulic pressure Pb1 provided that the automatic transmission 22 is shifted up or down while skipping the second-speed gear position "2nd" at the time of the failure. In this case, the oil chamber 59ca that receives the hydraulic pressure Pb1 is not provided.

While the automatic transmission 22 is placed in the reverse gear position through engagement of the clutch C3 and the brake B2 in the above-described embodiment, the reverse gear position may be established through engagement of the clutch C4 and the brake B2, for example. Also, while the automatic transmission 22 is placed in each gear position of the eight forward gear positions, the invention is not limited to this arrangement. Also, in the above embodiment, the forward gear positions inhibited from being established according to the shift command at the time of the failure to detect the operation position Psh are the forward gear positions established in association with the engagement device (i.e., the engagement device that stops rotation of the drive wheels 14) that causes locking of the drive wheels when engaged along with the one-way clutch F1. However, the forward gear positions inhibited from being established may be the forward gear positions established in association with the engagement device (the clutch C3 in the case where the reverse gear position is established through engagement of the clutch C4 and the brake B2, for example) that reduces the speed of rotation of the drive wheels 14. In sum, this invention may be applied to the automatic transmission 22, if it is an automatic transmission that is placed in a plurality of gear positions having different gear ratios when a selected one or more of a plurality of engagement devices and the one-way clutch F1 is/are engaged, and an automatic transmission having a forward gear position(s) established in association with the engagement device that restricts backward rotation of the drive wheels 14 when it is engaged along with the one-way clutch F1. Restricting backward rotation of the drive wheels 14 includes reducing the speed of rotation as well as stopping rotation.

While the engine 12 is illustrated as an example of driving power source in the above-described embodiment, this invention is not limited to this. For example, other prime mover, such as an electric motor, may be employed alone, or in combination with the engine 12, as the driving power source(s). While the power of the engine 12 is transmitted to the automatic transmission 22 via the torque converter 20 in the above-described embodiment, the invention is not limited to this arrangement. For example, other hydraulic transmission devices, such as a fluid coupling having no torque amplifying function, may be used in place of the torque converter 20. The hydraulic transmission device may not be necessarily provided. Also, the operation position "S" may be a manual shift operation position for changing the gear position of the automatic transmission 22 according to operation of the shift lever 82, or the operation position "S" may not be necessarily provided.

It is to be understood that the above-described embodiment is a mere example, and that this invention may be embodied with various changes, modifications or improvements, based on the knowledge of those skilled in the art.

What is claimed is:

1. An automatic shift control system comprising:
   an automatic transmission including
      a plurality of friction engagement devices,
      a one-way clutch, and
      a hydraulic control device configured to supply hydraulic pressures to the plurality of friction engagement devices and the one-way clutch, the hydraulic control device being configured to supply a reverse pressure to a first friction engagement device, the reverse pressure being a hydraulic pressure generated when an actual operation position of a shifting member is a backward traveling operation position, the first friction engagement device being a friction engagement device associated with establishment of a predetermined reverse gear position, the automatic transmission being configured to establish a plurality of gear positions having different gear ratios when a selected one or more of the plurality of friction engagement devices and the one-way clutch are engaged; and
   an electronic control unit configured to
      i) determine whether there is a failure to detect the operation position of the shifting member,
      ii) output a shift command to establish a given gear position when the operation position of the shifting member is a traveling operation position, and
      iii) output a shift command to be generated when the operation position is a forward traveling operation position, when the failure to detect the operation position of the shifting member occurs, such that predetermined forward gear positions are established, the predetermined forward gear positions being gear positions excluding at least one gear position established in association with a second friction engagement device, the second friction engagement device being a friction engagement device that restricts backward rotation of drive wheels when engaged along with the one-way clutch.

2. The automatic shift control system according to claim 1, wherein:
   the shift command to be generated when the operation position is the forward traveling operation position is a shift command for switching the predetermined forward gear positions according to a vehicle speed; and
   the electronic control unit is configured to output the shift command to be generated when the operation position is the forward traveling operation position, when the failure to detect the operation position of the shifting member occurs, such that the automatic transmission is shifted up or down while skipping the at least one forward gear position established in association with the second friction engagement device.

* * * * *